Jan. 12, 1965  A. A. BOTTONE  3,165,659
RECTANGULAR BEAM ELECTRIC INCANDESCENT LAMP
Filed March 8, 1962  2 Sheets-Sheet 1
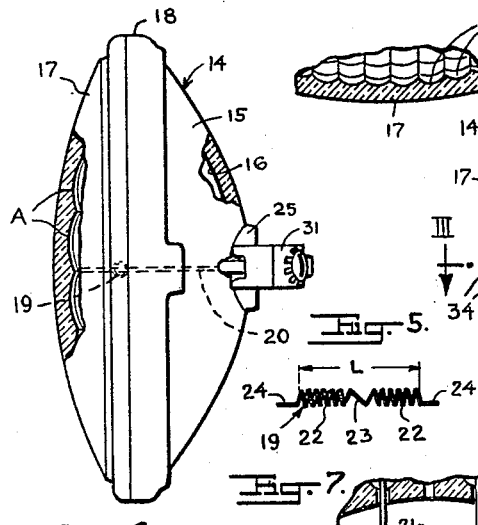
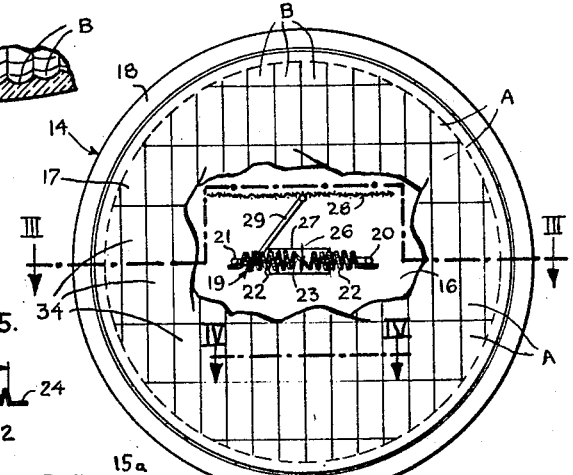
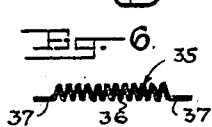
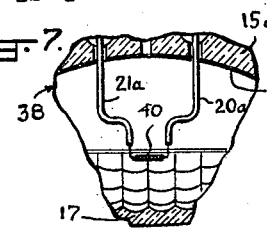
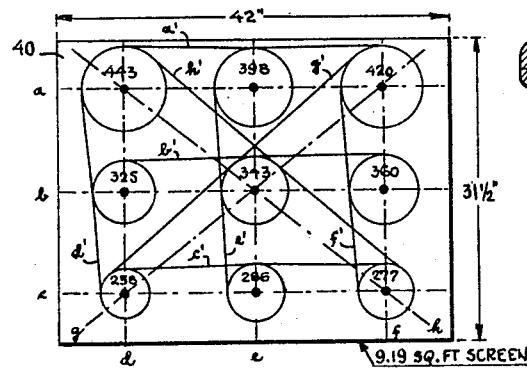
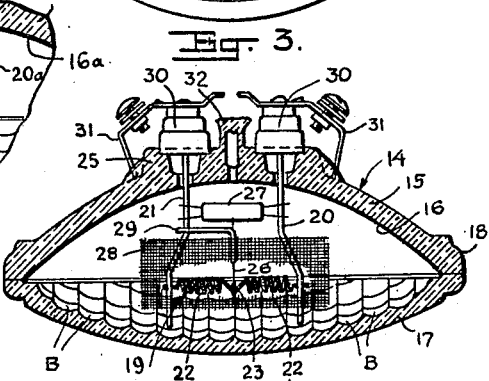
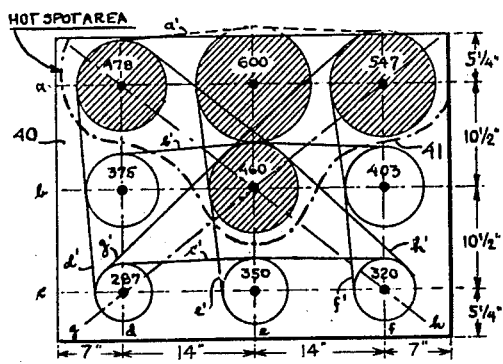
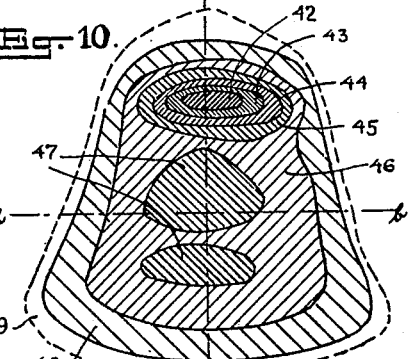
INVENTOR.
ARTHUR A. BOTTONE
BY D. S. Buleza
AGENT.

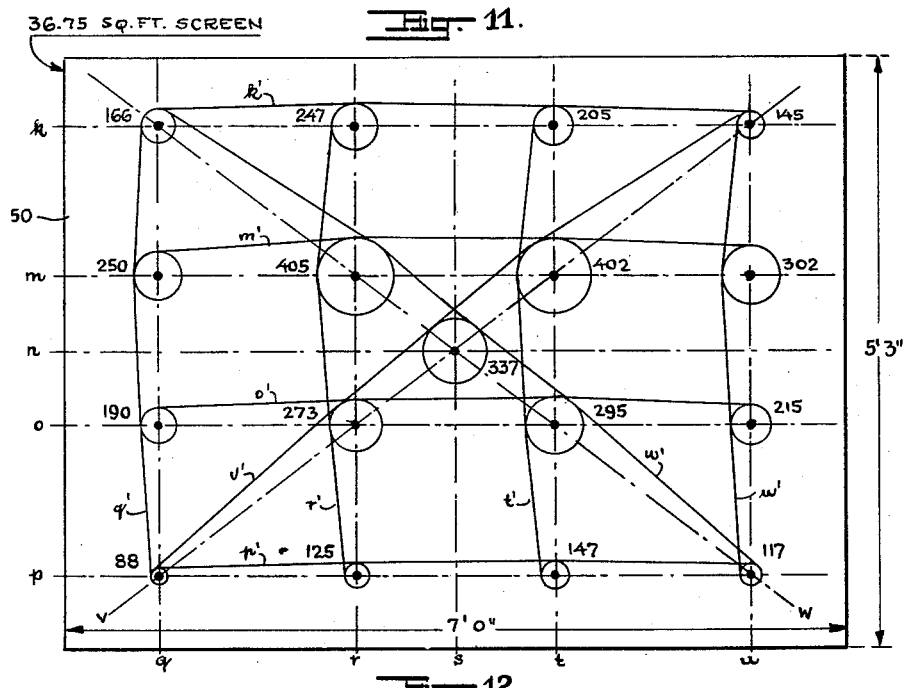
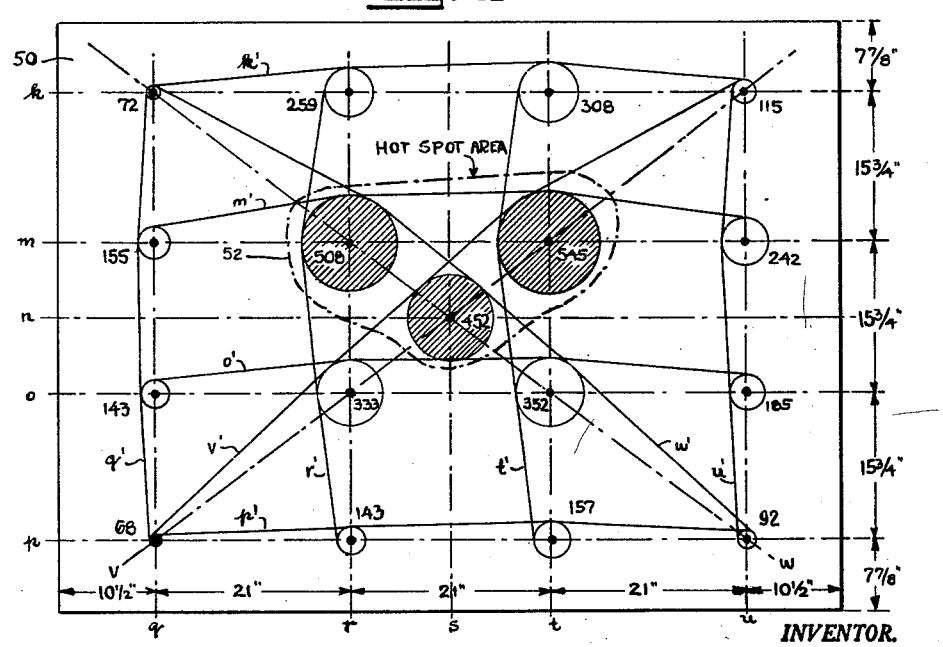

United States Patent Office 3,165,659
Patented Jan. 12, 1965

3,165,659
RECTANGULAR BEAM ELECTRIC
INCANDESCENT LAMP
Arthur A. Bottone, Madison Township, Middlesex County, N.J., assignor to Westinghouse Electric Corporation, East Pittsburgh, Pa., a corporation of Pennsylvania
Filed Mar. 8, 1962, Ser. No. 178,327
10 Claims. (Cl. 313—115)

This invention relates to lighting devices and, more specifically, to an electric incandescent projection lamp that is adapted for use as a camera light or the like.

Projection type incandescent lamps are well known in the art and are used where a concentrated beam of light is desired. Such lamps have been employed by photographers, for example, as flood lamps when taking movie pictures indoors. In order to obtain the light intensity required for properly exposed pictures, it has been the usual practice to mount four so-called 300 watt "R-30 type" flood lamps on a bar to provide a portable lighting unit that could be manipulated while the picture was being taken. While such "bar lights" provide sufficient illumination from a picture-taking standpoint and have been in use for many years, they require a plurality of lamps and are thus rather expensive and awkward to handle.

Experience has shown that such camera lights should have a rectangular beam pattern in order to concentrate the light on the scene being photographed and thereby improve the clarity of the pictures. Moreover, the beam spread should be such that the lighting unit can be used with conventional movie cameras having standard lenses as well as those having wide-angle lenses. The color temperature of the lamp should also be approximately 3400° Kelvin to provide properly balanced color pictures.

It is accordingly the general object of the present invention to provide an improved light source for floodlighting applications that avoids the foregoing disadvantages of the prior art.

Another and more specific object is the provision of an inexpensive incandescent projection lamp that is compact, light in weight and is thus adapted for use in a portable lighting unit.

Still another object is the provision of an incandescent projection lamp that has a rectangular beam pattern and a color temperature that meet the lighting requirements of cameras with standard and wide-angle lenses.

Briefly stated, the aforesaid and other objects are achieved according to this invention by providing an incandescent projection lamp having a filament, a lens and an integral parabolic reflector that are so designed and oriented with respect to one another that the light is projected outwardly in the form of a rectangular-shaped beam of substantially uniform intensity. The lens and reflector comprise vitreous members that are sealed together and enclose the filament thus providing a sealed-beam type lamp that is compact and very rugged. The filament is of the coiled-coil variety and is divided into two linear segments by an open segment. The lens configuration is such that the light rays from the aforesaid segments and the reflector are distributed in such a manner that the beam is spread over a sufficiently large area and is free from "hot spots."

A screen grid mounted over the filament collects most of the vaporized material so that the lamp has a long useful life and good light maintenance.

A better understanding of the invention will be obtained by referring to the accompanying drawings, wherein:

FIGURE 1 is a side elevational view, partly in section, of a sealed-beam 650 watt PAR 36 movie flood lamp embodying the invention;

FIG. 2 is a front elevational view of the lamp shown in FIG. 1, the central portion of the lens being broken away to reveal the mount structure;

FIG. 3 is a cross-sectional view through the lamp along the reference line III—III of FIG. 2, in the direction of the arrows;

FIG. 4 is a fragmentary horizontal section through the lens along the line IV—IV of FIG. 2;

FIG. 5 is a front elevational view of the sectional coiled-coil filament employed in the lamps shown in the preceding figures;

FIG. 6 is a similar view of a continuous coiled-coil filament which comparative tests showed was unsatisfactory;

FIG. 7 is a fragmentary cross-sectional view of a conventional automobile spot lamp having the same type lens as that employed in the lamps shown in the preceding figures but a much smaller and singly coiled filament;

FIGS. 8 and 9 are diagrammatic views of the beam and light-distribution patterns produced by a lamp embodying the invention and one having the continuous filament shown in FIG. 6, respectively;

FIG. 10 is an isocandle diagram showing the trapezoidal beam pattern obtained with a conventional spot lamp of the type shown in FIG. 7 having a very short continuously-wound filament; and FIGS. 11 and 12 are diagrammatic views of the beam and light-distribution patterns produced on a larger screen by a lamp embodying the invention and one having the continuous filament shown in FIG. 6, respectively.

While the present invention may be advantageously employed in various types of projection lamps, it is especially adapted for use in conjunction with flood lamps for movie cameras and the like and it has, accordingly, been so illustrated and will be so described.

THE INVENTION

In FIG. 1 there is shown a 650 watt sealed-beam lamp 14 constructed in accordance with the present invention. The lamp has a diameter of approximately 4½ inches and comprises a preformed vitreous reflector section 15 that is sealed at its periphery to a preformed vitreous lens section 17 so as to form an envelope (known in the art as a PAR 36) having a protruding rim 18. The rim is molded in such a way as to facilitate the accurate mounting of the lamp in its housing. The reflector section 15 is of substantially paraboloidal configuration and is coated interiorly with a film 16 of a suitable metal, such as aluminum for example, to form a reflector surface. A concentrated filament 19 is mounted within the envelope at approximately the focus of the reflector section 15.

As shown more particularly in FIG. 5, the filament 19 is of the coiled-coil type and linear configuration. It is wound from a suitable refractory metal wire such as tungsten. The filament is divided into two coiled segments 22 of substantially equal length by a shorter intermediate open segment 23 which, as here shown, preferably consists of a stretched or open convolution of the filament that lies within the plane of the filament. The turns comprising the coiled segments 22 are uniformly spaced a predetermined distance apart and are terminated by axially extending straight end segments or legs 24. The filament is thus of sectional design and is wound so as to have a predetermined coil length L (see FIG. 5).

As illustrated in FIGS. 2 and 3, the filament 19 is electrically connected to and supported in place by rigid lead-in conductors 20, 21 that are attached, as by welding, to the filament legs 24. The open segment 23 of the filament is centered at approximately the focus of the reflector section 15 and is held in such position by a support wire 26 that is embedded in a glass insulator 27 attached to the lead wires. The filament 19 is mounted in a plane that extends horizontally when the lamp is held in a vertical position, as shown in FIGS. 1 and 2, and the open segment 23 is located at the focal point of the reflector surface. The filament thus extends transversely of the axis of revolution of the reflector. Since the filament is anchored at three points the unsupported portions thereof are very short. The mount structure is thus very rugged and able to withstand mechanical shock and vibration without becoming damaged or dislocated.

In order to prevent vaporized material from the filament 19 from depositing on the reflector and lens surfaces, and thus progressively blackening them and reducing the light output of the lamp, a blackening collector 28 such as a nickel screen grid or the like is mounted above the filament as shown in FIGS. 2 and 3. The collector can be readily mounted in this position by means of an L-shaped support 29 that is spot welded to the center of the screen and to one of the lead-in conductors 21. As shown more particularly in FIG. 3, the screen collector is of rectangular configuration and extends well beyond the sides and ends of the filament 19.

As will be noted in FIG. 3, the lead-in conductors 20, 21 extend through openings in the rear of the reflector section 15 and are secured at their outer ends to metal ferrules 30 as by soldering or the like. The rims of the ferrules are sealed to a boss 25 on the back of the reflector section to form an hermetic seal in the well-known manner. Metal contact or terminal lugs 31 are fastened as by soldering to the outer ends of the ferrules and are provided with screws or the like to facilitate connecting the lamp to an electrical power supply. The lamp envelope is evacuated and filled with a suitable inert gas such as nitrogen or the like through an exhaust tubulation 32 that extends from the apex of the reflector section 15 and is tipped off in accordance with standard lamp-making practice after the gas-filling operation.

As shown most clearly in FIGS. 1 and 2, the lens section 17 is provided with a series of horizontally extending flutes A for vertically spreading the light rays emanating from the filament 19 and reflected by the reflector section 15. These horizontal flutes are preferably of concave shape, as shown in FIG. 1, and are of relatively large size. Superimposed on each of the horizontal flutes A are a series of vertically extending flutes B which horizontally spread the light rays from the lamp. These vertical flutes are also preferably of concave shape, as shown in FIGS. 3 and 4, and are of relatively small size compared to the horizontal flutes. The lens section is accordingly divided into a plurality of small rectangular windows or lens elements 34 (see FIG. 2) of predetermined configuration. As will also be noted in FIG. 2, the filament 19 is so oriented that the horizontal flutes A extend in a direction parallel to the filament whereas the vertical flutes B extend in a direction normal to the filament.

SPECIFIC EXAMPLE

Following is a specific example of the correlation of the filament and lens components required to obtain a rectangular-shaped beam pattern of satisfactory spread and uniformity in accordance with this invention. In the case of the 650 watt PAR 36 sealed-beam type lamp 12 shown having a diameter of approximately 4½ inches, the focal length of the parabolic reflector section 15 was approximately 1 inch and the sectional filament 19 had a coiled length L (see FIG. 5) of about 0.865 inch (approximately ⅞") and an outside diameter of about 128.1 mils. Each of the coiled segments 22 of the filament comprised six turns wound at about 18 turns per inch and a pitch of approximately 166%. The length of the open segment 23 was approximately ⅛ inch. The filament was fabricated from tungsten wire 7.735 mils in diameter that was first wound into a primary coil at approximately 71.8 (180%) turns per inch on a mandrel 18.0 mils in diameter. This primary coil was then coiled around a secondary mandrel 61.19 mils in diameter to form the final coil.

The lens section 17 in this particular case had horizontal flutes A of concave configuration and the flutes had a vertical height of around $19/32$ inch or so and were curved to a radius in the order of about ⅜ inch. The superimposed vertically extending flutes B were also of concave shape, as shown in FIGS. 3 and 4, and had a horizontal width of around ¼ inch or so and a radius of curvature of about $3/16$. The radius of curvature of the vertical flutes B within each of the horizontal flutes A varied so that the flute segments had a progressively increasing light spread throughout their vertical extent and the light was thus spread horizontally through a wider angle at the bottom than at the top of the segments. The lens section 17 was accordingly divided into a plurality of rectangular windows or elements 34 of glass (see FIG. 2) $19/32$" x ¼" having optical characteristics such that the light rays from a very short continuously-wound filament, such as that used in automotive spot lamps or the like (described below), are concentrated into a beam of trapezodial configuration—that is, a beam that is wider at the base than at the top. A lens of this general type is disclosed in U.S. Patent No. 2,568,494, dated September 18, 1951.

The lens section 17 in the particular embodiment here shown produced a trapezoidal beam pattern having a horizontal spread of about 34° at its base, a horizontal spread of 14° at its upper extremity and a vertical spread of 24° when employed in a conventional automotive spot light lamp 38 of the type shown in FIG. 7 having a parabolic reflector section 15a of the same size as the one used in the flood lamp 14 shown in FIGS. 1 to 3. In accordance with standard lamp-making practice, the spot lamp 38 contains a horizontally disposed singly-coiled concentrated filament 40 about 0.310 inch in length that is supported by lead-in conductors 20a and 21a at approximately the focus of the reflector. The reflector section is also coated with a film 16a of aluminum or the like.

BEAM PATTERN AND LIGHT UNIFORMITY CHARACTERISTICS

In order for a flood lamp that is intended for use with movie cameras to be practical it must have a rectangular-shaped beam pattern and have a light intensity that is substantially uniform throughout the beam. In addition, the beam must have sufficient vertical and horizontal spread to accommodate not only cameras having conventional or standard lenses but those having so-called wide-angle lenses.

The beam characteristics of various lamps relative to the acceptance angle of a standard movie camera lens were compared by placing a rectangular screen 31½ inches by 42 inches (see FIG. 8) in front of the test lamps at a point located 10 feet away from the surface of the lamp lens. The screen accordingly had an area of 9.19 square feet, which roughly corresponds to the acceptance angle of a standard lens. Foot candle readings were then taken with a light meter at nine different points on the screen. These points were determined by means of three horizontally and three vertically extending lines on the screen and represent the points where the lines intersected.

The beam patterns obtained with the lamp 14 constructed in accordance with the invention and an identical lamp having a continuous more compact filament 35 of the type illustrated in FIG. 6 are shown in FIGS. 8 and 9, respectively. The filament 35 had a coiled segment 36 about 0.750 inch in length and had straight legs 37 at each end.

As shown in FIG. 9, the horizontal grid lines $a$, $b$ and $c$ were spaced 10½ inches apart and 5¼ inches from the upper and lower edges of the screen 40. The vertical grid lines $d$, $e$ and $f$ were spaced 14 inches apart and 7 inches from the sides of the screen. The screen was further subdivided by diagonal lines $g$ and $h$.

In order to illustrate the character of the beam pattern as regards its configuration and intensity more clearly, a circle having a radius proportional to the average foot candle reading obtained at each point on the screen has been drawn around the respective points. The average foot candle values for the group of three lamps of each type tested are also indicated at each of the points. In addition, lines $a'$, $b'$, etc. drawn tangent to the respective circles in a horizontal, vertical and diagonal direction give a visual indication of the variation in light intensity in these regions. The slope of these tangential lines relative to the straight lines joining the centers of the circles indicates the degree of non-uniformity. That is to say, if the line tangent to the circles approaches or veers away from the broken line joining the centers of the circles at a sharp angle, the light intensity along this portion of the screen (or beam) changes quite rapidly from point to point. On the other hand, slight variations from true parallelism between the respective sets of lines indicates that the light intensity throughout this region is quite uniform.

As shown in FIG. 8, the 650 watt PAR 36 sealed-beam lamp 14 having an elongated sectional filament 19 whose dimensions are correlated with that of the lens section 17 in accordance with this invention has a beam pattern which fills the rectangular screen 40. The light intensity in the upper portions of the beam is slightly higher than that along the lower portion, as evidenced by the slight divergence of the vertical lines $d-d'$, $e-e'$ and $f-f'$ and the light readings. The light-distribution horizontally and diagonally across the beam are very uniform as indicated by the substantial parallel relationship of the lines $a-a'$, $b-b'$, $c-c'$, $g-g'$ and $h-h'$. The lamp 14 accordingly provides a rectangular-shaped beam pattern that is substantially uniform and devoid of any "hot spots."

The marked difference produced by an apparently minor change in the configuration of the lamp filament is indicated by the beam pattern and light measurements shown in FIG. 9 obtained from test lamps having a continuously wound and more concentrated coiled-coil filament 35 of the type illustrated in FIG. 6.

As shown in FIG. 9, the beam produced by a lamp having such a continuously wound and shorter filament contains a "hot spot" area that extends from the center of the screen 40 upwardly to the top and sides thereof, as indicated by the broken line 41 which encloses the shaded circles drawn around those points at which the light intensity was above 450 foot candles. As a result, the light-distribution within the beam projected by this type lamp is very poor as shown by the relative sizes of the circles and the large and progressively increasing divergence of the vertical lines $d-d'$, $e-e'$ and $f-f'$. The light intensity also varies noticeably as one proceeds diagonally across the beam from the lower corners of the screen to the oppositely disposed upper corners, as evidenced by the divergence between the diagonal lines $g-g'$ and $h-h'$. The uniformity horizontally across the beam is also poor as denoted by the increasing divergence of the lines $a'$, $b'$ and $c'$ as one proceeds from the edges toward the center of the screen.

The marked change produced in the beam pattern by properly correlating the dimensions of the filament and the optical characteristics of the lens in accordance with the invention is also illustrated by FIG. 10 which shows the beam pattern obtained on a screen placed 50 feet away from a standard automotive spot lamp 38 of the type shown in FIG. 7 having the same type lens section but a continuously-coiled and much more compact filament 40. The beam is divided into regions of equal light intensity to form a so-called "isocandle" diagram. As shown in FIG. 10, the beam is of trapezoidal configuration and has a very pronounced elliptical hot spot 42 of generally elliptical configuration near the top of the trapezoid. This hot spot is surrounded by regions 43, 44 and 45 of decreasing light intensity and substantially the same configuration. These regions are, in turn, enclosed by a generally rectangular region 46 of still lower intensity. Included within this latter region are two additional hot spots 47 of substantially the same light intensity as the elliptical region 45. The beam extremities comprise trapezoidal-shaped areas 48 and 49 of even lower intensity.

Lamps having elongated sectional filaments (FIG. 5) in accordance with the present invention were also compared to test lamps having shorter and continuous filaments (FIG. 6) to determine the beam and light uniformity patterns obtained on a larger screen 50, which patterns are shown in FIGS. 11 and 12, respectively. As noted in FIG. 11, the screen is 7 feet wide and 5 feet 3 inches high and covers an area of 36.75 square feet, which corresponds roughly to the acceptance angle of the lenses used with wide-angle movie cameras. Horizontal grid lines $k$, $m$, $o$ and $p$ spaced 15¾ inches apart and 7⅞ inches from the upper and lower edges of the screen (see FIG. 12) were used in conjunction with vertical grid lines $q$, $r$, $t$ and $u$ spaced 21 inches apart and 10½ inches from the sides of the screen to determine the reading points. The screen was also bisected by a horizontal line $n$ and a vertical line $s$. Readings were taken at each of the points where the aforesaid horizontal and vertical lines intersected so that 17 readings in all were taken. Lines $v$ and $w$ which diagonally bisected the screen were also used as before.

As shown in FIG. 11, the beam pattern produced on the large screen 50 by the 650 watt PAR 36 flood lamp 14 embodying the present invention is also rectangular and substantially uniform in intensity throughout the beam area, as evidenced by the absence of abrupt changes in the sizes of the circles drawn about the various points along the various grid lines. While the intensity is greatest at the center of the screen, none of the readings exceed or even approach 450 foot candles so that there are no "hot spots" anywhere in the beam. The divergence of the tangential lines $k'$, $m'$, $o'$, etc. from the corresponding grid lines $k$, $m$, $o$, etc. drawn through the centers of the circles is also very small indicating that the light uniformity varies only slightly as one proceeds across the beam in a given direction. The light intensity is exceptionally uniform along the horizontal grid lines.

In contrast, the beam pattern obtained with the same type of lens but a shorter and continuous coil 35 of the type shown in FIG. 6 has a very noticeable hot spot at the center, as evidenced by the large shaded circles enclosed by the broken line 52 in FIG. 12. In addition, the marked divergence of the tangential lines $k'$, $m'$, etc. from the corresponding horizontal and vertical grid lines $k$, $m$, etc. shows that the light intensity increases rapidly as one approaches the center of the beam and then rapidly falls off as one proceeds to its extremities. It is accordingly apparent that the absence of the stretched center turn or open segment in the coiled body of the filament produces a very undesirable concentration of light in the central and upper portions of the beam, regardless of the area over which measurements are taken.

While the light readings obtained with the continuously wound filament 35 are somewhat higher than those obtained with the elongated sectional filament 19, this apparent advantage is entirely nullified by the fact that the uniformity with which the light is distributed is far more important when taking pictures than the amount or intensity of the light produced by the lamp.

One commonly used method of comparing the light uniformity characteristics of two beam patterns is to compare the average corner reading with the center reading obtained on the screen and to express this ratio in the terms of a percentage of the center reading. This figure is known as the "average corner-to-center" ratio. This value for 650 watt PAR 36 lamps having the same "trapezoidal" lens and a sectional and continuous coiled-coil of the same rating are compared below in Table I.

*Table I*

| Lamp Type | Corner-To-Center Ratio (Percent) | |
|---|---|---|
| | Small Screen | Large Screen |
| Continuous filament | 89.3 | 19.3 |
| Sectional filament | 102.0 | 38.5 |

As will be noted from the foregoing table, the average corner-to-center ratio is much higher in both cases for the lamps having the elongated sectional filaments. Specifically, in the case of the small screen this ratio is over 14% higher when the sectional filament is used. The increase is about 100% in the case of the large screen. This very marked improvement in the light uniformity of the projected beam, coupled with the fact that the filament operates at a color temperature of approximately 3400° Kelvin, provides a very useful flood lamp for use with either standard or wide-angle lens movie cameras, especially in those cases where color film is used and color balance is important.

It will be appreciated from the foregoing that the objects of the invention have been achieved insofar as a very compact and rugged flood lamp has been provided. The lamp has a rectangular-shaped and very uniform beam pattern that makes it especially advantageous for use as a portable light source for cameras.

Moreover, the lamp generates approximately as much light as the four 300 watt so-called "R-30" flood lamps employed heretofore with such cameras thereby not only reducing the size of the lighting unit but reducing its cost.

While a specific embodiment has been illustrated and described in detail, it will be appreciated that various modifications in both the construction and arrangement of parts can be made without departing from the spirit and scope of the invention.

For example, lenses having flute dimensions and configurations which differ from those specified but which have substantially the same effect on the light rays can be designed and used with the same advantageous results.

I claim as my invention:

1. An incandescent electric lamp comprising, a substantially paraboloidal reflector member, a concentrated filament of linear configuration supported approximately at the focus of said reflector member, said filament extending transversely of the axis of revolution of said reflector member and comprising a pair of coiled segments joined by an open segment that is approximately centered at the focus of said reflector member, and a light-transmitting lens sealing the opening of said reflector member and having one group of flutes that extend in a direction parallel to said filament and another group of flutes that extend in a direction normal to said filament, said flutes being superimposed on said lens and being of such configuration that they direct the light from said filament and reflector member, when said filament is energized, into a beam of light having a rectangular-shaped beam pattern of predetermined dimensions and substantially uniform intensity.

2. An incandescent electric lamp as set forth in claim 1 wherein the coiled segments of said filament are of substantially equal length and longer than the open segment.

3. An incandescent electric lamp as set forth in claim 1 wherein the open segment of said filament comprises a stretched filament turn that lies within the plane of said filament.

4. An incandescent electric lamp as set forth in claim 1 wherein said filament is of the coiled-coil type and is substantially normal to the axis of revolution of said reflector member.

5. A sealed-beam type incandescent projection lamp adapted for use in floodlighting applications comprising, a vitreous envelope having a substantially paraboloidal reflector section and a lens section, a reflective coating on the concave surface of said reflector section, a coiled-coil filament of linear configuration and predetermined length mounted approximately at the focus of said reflector section and extending in a direction normal to the axis of revolution of said reflector section, said filament being divided into two segments of substantially equal length by an open segment that is approximately centered at the focus of said reflector section, the lens section of said envelope being divided into a plurality of lens elements by a series of mutually perpendicular flutes that are superimposed one over the other and arranged so that one set of flutes lie parallel to said filament, the coil length of said filament and the optical characteristics of said lens elements being so correlated that the light produced by said filament, when energized, and reflected by said reflector section is concentrated into a beam of light that has a rectangular-shaped beam pattern of predetermined dimensions and substantially uniform intensity.

6. A sealed-beam type projection lamp as set forth in claim 5 wherein, the diameter of said envelope is approximately 4½ inches, and said filament has a coil length of about ⅞ inch.

7. A sealed-beam type projection lamp as set forth in claim 5 wherein said filament, when operated at its rated voltage, has a color temperature of about 3400° Kelvin.

8. In an electric incandescent lamp, the combination of a substantially paraboloidal reflector surface, a coiled-coil filament located approximately at the focal point of said reflector surface and extending transversely of the axis of revolution of said surface, and a lens in front of said reflector surface and filament, said filament being divided into two substantially equal segments by an opened turn that is centered at the focal point of said reflector surface, the dimensions of said filament and the configuration of said lens being so correlated that the light rays generated by said filament are concentrated by said reflector surface and lens into a beam of light having a rectangular-shaped beam pattern of predetermined dimensions and substantially uniform intensity.

9. The combination set forth in claim 8 wherein a blackening collector is mounted above and extends along a considerable portion of said filament.

10. A 650 watt sealed beam incandescent lamp adapted for floodlighting applications comprising, a vitreous reflector section of substantially paraboloidal configuration, a reflective coating on the concave surface of said reflector section, a vitreous lens sealed to the periphery of said reflector section and forming therewith a sealed envelope having a diameter of approximately 4½ inches, a pair of lead-in conductors sealed through said reflector section, a coiled tungsten filament of linear configuration fastened to the inner ends of said lead-in conductors and supported thereby at approximately the focus of said reflector section and in transversely extending relationship relative to the axis of revolution of said reflector section, said filament having a coiled length of approximately 7/8 of an inch and being divided into two segments of substantially equal length by an open turn that is centered at approximately the focal point of said reflector section, the lens section of said envelope being divided into a plurality of lens elements by a series of mutually perpendicular flutes that are superimposed one over the other on said lens section and arranged so that one set of flutes extend parallel to said filament, the optical characteristics of said lens elements being so correlated relative to the dimensions and configuration of said filament that the light rays produced by said filament, when the latter is energized, and reflected by said reflector section are concentrated into a beam of light having a rectangular-shaped beam pattern of predetermined dimensions and substantially uniform intensity.

References Cited in the file of this patent
UNITED STATES PATENTS

| | | |
|---|---|---|
| 2,177,217 | Howard | Oct. 24, 1939 |
| 2,912,610 | Verbeek | Nov. 10, 1959 |